Patented Feb. 2, 1943

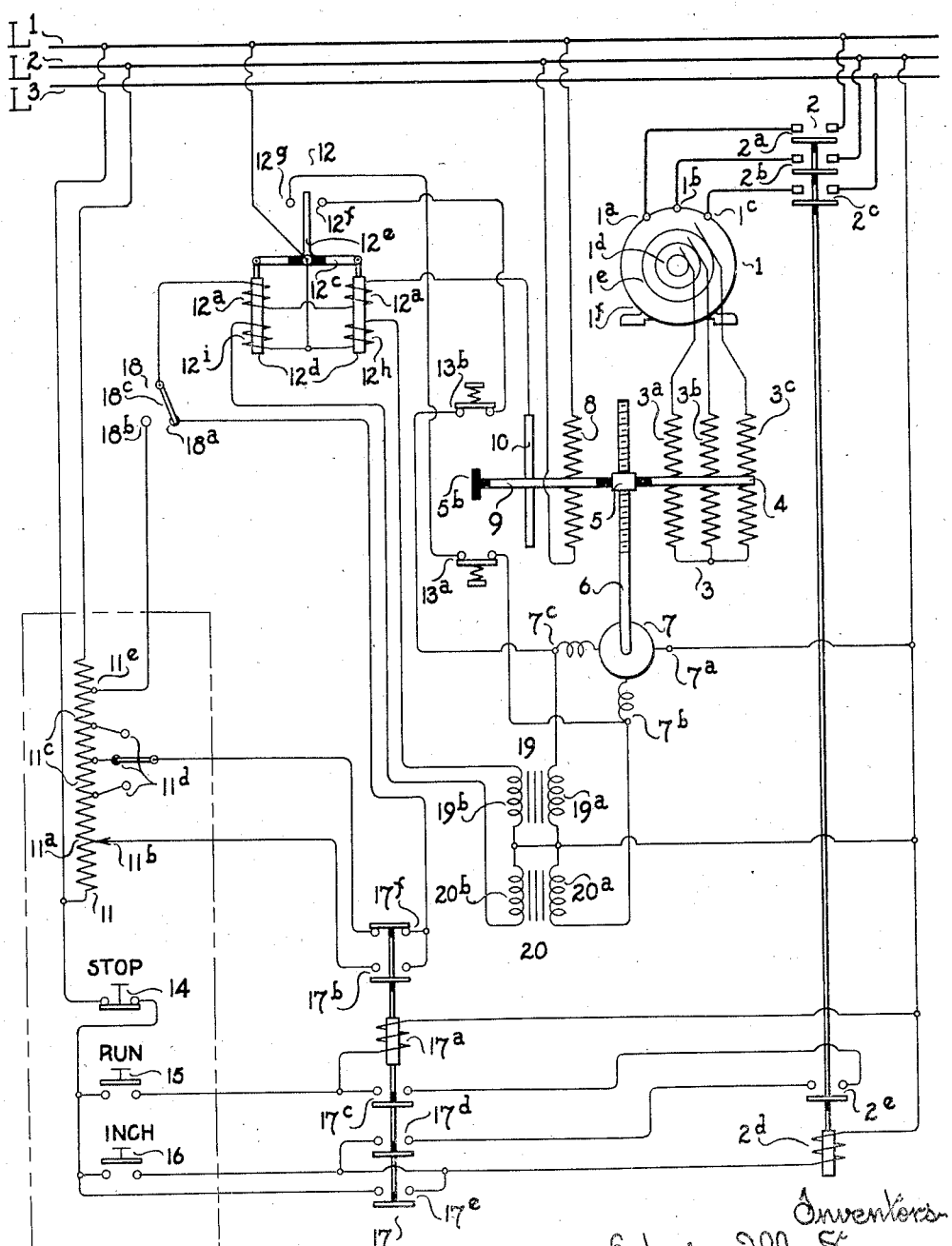

2,309,794

UNITED STATES PATENT OFFICE 2,309,794

CONTROLLER FOR INDUCTION MOTORS

Edwin W. Seeger, Wauwatosa, Wis., and Carroll Stansbury, Chevy Chase, Md., assignors to Cutler-Hammer, Inc., Milwaukee, Wis., a corporation of Delaware Application February 23, 1942, Serial No. 432,062

6 Claims. (Cl. 172—179)

The invention relates to improvements in controllers for induction motors, and while not limited thereto, is particularly applicable to the control of alternating current motors driving printing presses and the like.

Printing presses are usually controlled from pushbutton stations, which stations are equipped with individual pushbuttons which are actuated for starting, stopping, inching, and the like. When the starting or running button is depressed, it is usually desired to start the press and bring it up to a desired preset speed. When the inching button is depressed it is desired to operate the press, but only as long as the inching button is depressed, at a certain minimum speed which is usually lower than the lowest running speed. It is also desired that after depression of the stopping button; or upon failure of power; or upon the occurrence of any disarrangement of the press, that when subsequently restarting the motor will have a definite optimum part of its total secondary resistance inserted in circuit.

An object of the present invention is to provide a controller of the aforementioned type which provides for gradual stepless acceleration from one speed to another during the starting of the press.

Another object is to provide a controller in which the same resistance and operating means are employed for threading, inching and running.

Another object is to provide a controller comprising a main motor controller, and a presetting control station, requiring a minimum number of connecting wires between the control station and the main controller.

Another object is to provide a controller which insures automatic return of the control elements to the minimum speed position upon operation of the stop pushbutton, and insures such positioning of the control elements prior to restarting of the motor after voltage failure.

Another object is to provide a controller which after stopping of the motor is always ready for restarting without excessive current.

Another object is to provide a controller of the aforementioned type with automatic means to cause a motor to operate at a predetermined extremely slow speed in the event of certain irregularities in the operation of the press.

Other objects and advantages will hereinafter appear.

The accompanying drawing is illustrative of a system embodying the invention.

The system comprises a printing press (not shown), which is to be operated by an alternating current motor 1, supplied with electrical energy from the bus bars $L^1$, $L^2$, $L^3$ of a three-phase alternating current system. The motor is of the slip-ring type and has a primary or stator winding provided with terminals $1^a$, $1^b$ and $1^c$, and a secondary or rotor winding connected to slip rings $1^d$, $1^e$ and $1^f$. The stator winding may be connected to the lines $L^1$, $L^2$ and $L^3$, by means of an electromagnetic switch 2, which is provided with normally open main contacts $2^a$, $2^b$ and $2^c$, for connecting the primary winding of the motor to the power supply lines $L^1$, $L^2$ and $L^3$, respectively. The switch 2 also has an energizing winding $2^d$ and normally open auxiliary contacts $2^e$.

A variable resistor 3, comprising three sections $3^a$, $3^b$ and $3^c$, one for each phase, is connected to the secondary winding of the motor. The values of the resistors $3^a$, $3^b$ and $3^c$ may be varied by means of a commutating brush 4 which is connected to, but insulated from, a traveling nut 5 to move therewith. The traveling nut 5 engages a threaded stem 6, which is driven by a reversible single phase motor 7, having an energizing winding including line terminal $7^a$ and reversing terminals $7^b$ and $7^c$. If the motor 7 is rotated in one direction or the other by the selective connection of the terminal $7^b$ or $7^c$, the stem 6 rotates, thereby reciprocating the nut 5 and with it the commutator 4 which latter varies the resistors $3^a$, $3^b$ and $3^c$ of the motor 1, to vary the speed of the latter.

Arranged in proximity to the commutator 4, is a potentiometer receiver rheostat or resistor 8, which is connected across the lines $L^1$ and $L^2$, and which is provided with a commutator brush 9, the latter being insulatedly attached to the traveling nut 5 to move therewith. The brush 9 completes a circuit between the resistor 8 and a contact bar 10. Connected between the lines $L^1$ and $L^2$, is a potentiometer sender rheostat 11, which has a variable high speed section $11^a$, provided with a movable contact $11^b$, a low speed section $11^c$, provided with a number of selectable taps $11^d$, and a creeping speed tap $11^e$. The contact $11^b$ is connected through normally open contacts $17^b$ of a relay 17, contact $18^a$ and contactor $18^c$ of a safety switch 18, the coils $12^a$ of a center-biased reversing relay 12, to the contact bar 10, and from there through the brush 9 to the receiver rheostat 8.

The relay 12 is provided with a center pivoted arm $12^c$, to the ends of which are attached magnetic cores $12^d$ for the coils $12^a$. The coils $12^a$ are stationary, and the magnetic cores are capable of moving axially relatively to the former. The relay arm $12^c$ is provided with a movable contact arm $12^e$, which is arranged to make contact with stationary contacts $12^f$ and $12^g$, respectively, upon deflection of the arm $12^e$ from the center position in one direction or the other. The contact arm $12^e$ is connected to the line $L^1$, while the contacts $12^f$ and $12^g$ are respectively connected through limit switches $13^b$ and $13^a$ to the terminals $7^c$ and $7^b$ of the motor 7, and the terminal $7^a$ of the motor 7 is connected to the line $L^2$. Therefore, when the relay contact arm $12^e$ is deflected in one direction or the other the terminal $7^b$ or $7^c$ is energized, causing the motor 7 to rotate in one direction or the other, thereby varying the value of the resistors $3^a$, $3^b$ and $3^c$ and thus the speed of the motor 1, and at the same time varying the potential which is impressed upon the bar 10 by the cooperation of brush 9 with receiver resistor 8.

If the potential difference between the brush $11^b$ and the bar 10 is zero, no current flows through the windings $12^a$, and the relay is in its center position so that the motor 7 stands still and the motor 1 runs at a speed depending upon the position of the commutator 4, which in turn corresponds to the position of the contact $11^b$. If, on the other hand, a potential difference exists between the contact $11^b$ and the bar 10, the contact arm $12^e$ of relay 12 is deflected in one direction or the other and the motor 7 is energized to shift the nut 5 in the proper direction, to change the values of resistors 3 and 8 until a balance is again restored.

The limit switches $13^a$ and $13^b$ are arranged adjacent to the low speed position and the high speed position, respectively, of the traveling nut 5. They are normally closed and are opened by an abutment $5^b$ attached to and movable with the traveling nut 5, when the nut reaches an extreme position, corresponding to maximum or zero resistance, respectively, in the secondary circuit 3 of the motor.

The system is further provided with a normally closed stop button 14, normally open running button 15, normally open inching button 16, and the aforementioned electromagnetic relay 17, having an energizing winding $17^a$, normally open contacts $17^b$, $17^c$, $17^d$ and $17^e$ and normally closed contacts $17^f$.

The aforementioned double-throw safety switch 18 may be installed on the printing press. The switch is provided with stationary contacts $18^a$ and $18^b$ and with a movable contact $18^c$ which may be selectively connected to one or the other of the stationary contacts. The switch 18 is of well known form and is so arranged that it normally completes a circuit through the movable contact $18^c$ and stationary contact $18^a$ and is arranged to open this circuit and at the same time to close a circuit through contact $18^b$, if the paper in the printing machine should not properly register, or, if desired, the safety switch 18 may serve other purposes.

As aforementioned, the contact $18^a$ is connected in series with the normally open contacts $17^b$, while the movable contact $18^c$ is connected in series with the coils $12^a$ of the relay 12. One of the selectable slow speed taps $11^d$ is also normally connected to the contact $18^a$ through the normally closed contacts $17^f$, while the tap $11^e$ for the creeping speed is connected to the contact $18^b$. Hence, when the contact $18^c$ is moved by the press from its normal position it opens the circuit to contact $18^a$ and closes a circuit to contact $18^b$ to connect the creeping resistance directly to the coils $12^a$ of the relay 12.

Connected between the terminal $7^c$ and line $L^2$ and between terminal $7^b$ and line $L^2$, respectively, are the primary windings $19^a$ and $20^a$ of transformers 19 and 20, respectively. The secondary winding $19^b$ of the transformer 19 is connected in series with a magnetizing coil $12^h$, mounted in cooperative relationship with one of the magnetic cores $12^d$ of the relay 12, while a secondary winding $20^b$ is connected in a similar relationship to the other coil $12^i$ of the relay 12. The connections of these windings are such that when the contact arm $12^e$ makes contact with the stationary contact $12^f$ or $12^g$, respectively, one or the other of the secondary windings $19^b$ or $20^b$ is connected in series with the respective coil $12^h$ or $12^i$, across the lines $L^1$ and $L^2$ to amplify the effect of energization of the coils $12^a$ upon the cores $12^d$ to effect movement of contact arm $12^e$. As a current is induced in the winding $19^b$ or $20^b$ by the current flowing in the respective primary winding $19^a$ or $20^a$, the pull on the respective magnet core $12^d$ is increased.

The connections of the control circuits are as follows: A circuit leads from line $L^1$ through the stop pushbutton 14, thence through the run pushbutton 15, when depressed, through the energizing coil $17^a$, to line $L^2$. Another circuit extends from line $L^1$ through the stop pushbutton 14, the normally open contacts $17^e$ (when closed) through the magnetizing winding $2^d$ to line $L^2$, and a further circuit extends from the contacts $17^e$, through the contacts $17^d$, contacts $2^e$, contacts $17^c$, coil $17^a$ to line $L^2$. Still another circuit extends from line $L^1$ through the stop pushbutton 14, the inch pushbutton 16 (when closed); thence through coil $2^d$ to line $L^2$, and also through contacts $17^d$, $2^e$ and $17^c$ through coil $17^a$ to line $L^2$.

The system operates as follows: If, with the lines $L^1$, $L^2$ and $L^3$ energized, it is desired to start the motor and run it at a given high speed, the contact $11^b$ is adjusted or set to a point on the sending rheostat 11 corresponding to such speed. Thereafter the run button 15 is momentarily depressed. This energizes the relay coil $17^a$ and the relay 17 closes, thereby closing the contacts $17^e$ which energizes the main switch 2.

Closure of the main switch 2 connects the primary or stator winding of the motor 1 to the lines $L^1$, $L^2$ and $L^3$ and current flows through the secondary or rotor winding. Energization of relay 17 also closes the contacts $17^b$, $17^c$ and $17^d$ and opens contacts $17^f$. Energization of switch 2 closes contacts $2^e$. A holding circuit is thereby established for the coil $17^a$ from line $L^1$ over stop button 14, and contacts $17^e$, $17^d$, $2^e$, $17^c$ through said coil $17^a$, so that the run button 15 may be released, and the relay 17 and the main switch 2 remain energized. If a potential difference exists between the bus bar 10 and the contact $11^b$, a current flows in one or the other direction between $11^b$ through contacts $17^b$, switch 18, through coils $12^a$, and bus bar 10. This causes deflection of the contact arm $12^e$ of relay 12 to energize the motor 7 in one direction or the other, thereby causing movement of the commutator 4 in the desired direction, until the positions of the traveling nut 5 and of the commutators 9 and 4 correspond to the position of the contact $11^b$, whereupon the arm $12^e$ of relay 12 returns to the center position and deenergizes the motor 7.

The motor 1 then continues to operate at the desired speed.

When the terminals 7ᵇ or 7ᶜ are connected to the line L¹ through the relay 12, the primary winding 20ᵃ or 19ᵃ of one or the other of the transformers 20 or 19 is also energized. This causes a current to flow in the winding 20ᵇ or 19ᵇ, which current energizes the corresponding coil 12ⁱ or 12ʰ of relay 12, thereby amplifying the torque of the latter until such time as the current in the coils 12ᵃ becomes zero. Only one of the magnet cores 12ᵈ will then be magnetized by the current in the coil 12ʰ or 12ⁱ, as the case may be, and the resulting pull is only a small fraction of the pull created by the coils 12ᵃ when energized. As a result, the relay 12, responding to the center-biasing means thereof, returns to the off position to deenergize the motor 7 as aforedescribed and at the same time the transformer 19 or 20 is deenergized.

Upon pressing of the stop button 14, the main switch 2 and the relay 17 are deenergized and the motor 1 is disconnected from the line. At the same time the contacts 17ᵇ are opened and the contacts 17ᶠ are closed. The contacts 17ᶠ establish a circuit from a selected slow speed tap 11ᵈ through the contact 17ᶠ, the relay coils 12ᵃ to the bus bar 10, which causes the motor 7 to be energized to return the traveling nut 5 to a position corresponding to the voltage at the tap 11ᵈ, so that upon reconnection of the motor by the operation of the run button 15 or the inch button 16 the secondary resistance in the motor circuit is of such value as to operate the motor 1 at the desired torque.

If it is desired to inch the equipment the button 16 is depressed. This energizes the main switch 2 but the relay 17 remains deenergized so that the relay coils 12 are controlled by one of the adjustable tap connections 11ᵈ and the motor will only operate at the low speed corresponding to a relatively high torque.

If the safety switch 18 is operated at any time to effect disengagement of its movable contact 18ᶜ from stationary contact 18ᵃ and engagement of the former with stationary contact 18ᵇ, it disconnects the windings 12ᵃ from either the contact 11ᵇ or the tap 11ᵈ and connects them to the tap 11ᵉ. As a result of this connection the current flow in the relay winding causes the energization of the motor 7 and return of the crosshead 4 to the position of maximum resistance in the circuit of the motor 1 so that the printing press is operated at a creeping speed until adjustment of the press is made and the safety switch is again thrown into the normal operating position.

We claim:

1. In a system operable at different speeds, in combination, an electric motor, a variable resistor for regulating the speed of said motor, electromagnetic reversing means adapted to vary said resistor, a potentiometer receiver supplied with a constant input voltage and affording a variable output voltage, means connected to said reversing means and arranged to vary the output voltage of said receiver in accordance with the variations of said regulating resistor, a potentiometer sender supplied with a constant input voltage and provided with means affording a first output voltage corresponding to a desired running speed, and a second output voltage corresponding to a creeping speed of said motor, means adapted to control said reversing means in response to the difference between the output voltage of said receiver and one of the output voltages of said sender, means to subject said last mentioned means to the output voltage of said receiver and of the first sender output voltage, and associated means operable under certain conditions to automatically terminate the influence of said first sender output voltage upon said voltage difference responsive means and to subject said means to the influence of said second sender output voltage.

2. In a system operable at different speeds, in combination, an electric motor, a variable resistor for regulating the speed of said motor, electromagnetic reversing means adapted to vary said resistor, a potentiometer receiver supplied with a constant input voltage and affording a variable output voltage, means connected to said reversing means for varying the output voltage of said receiver in accordance with the variations of said regulating resistor, a potentiometer sender supplied with a constant input voltage and provided with means affording a first output voltage corresponding to a desired running speed, a second output voltage corresponding to a desired value of said resistor for starting and inching said motor, and a third output voltage corresponding to a creeping speed of said motor, means adapted to control said electromagnetic means in response to the difference between the output voltage of said receiver and one or another of the output voltages of said sender, means for inching and running said motor including an electromagnetic switch to connect it to a source of current supply and to subject said voltage difference responsive means to the output voltage of said receiver and of the first or second sender output voltage, selectively, and means operable in response to abnormal conditions of the system to eliminate the influence of said first or said second sender output voltage upon said voltage difference responsive means and to subject the latter to the influence of said third sender output voltage.

3. In a drive for printing presses and the like, in combination, a variable speed driving motor, a speed regulating resistor in circuit with said motor, a reversible pilot motor for varying said resistor, a receiver comprising a potentiometer supplied with a constant input voltage and affording a variable output voltage, means operable by said pilot motor for varying the output voltage of said receiver in accordance with variations of said resistor, a sender comprising a potentiometer supplied with a constant input voltage and provided with means affording a first output voltage corresponding to a desired running speed of said driving motor, a second output voltage corresponding to a desired value of said regulating resistor for starting and inching said driving motor, and a third output voltage corresponding to a creeping speed of said driving motor, a reversing relay adapted to control said pilot motor in response to the difference between the receiver output voltage and one of the sender ouput voltages, an inching pushbutton switch and a running pushbutton switch, both biased to open position, an electromagnetic switch energizable by said inching switch to connect said motor to a source of current supply, an electromagnetic relay energizable by closure of said running switch, said electromagnetic relay being adapted when deenergized to subject said reversing relay to said second sender ouput voltage and when energized to energize said electromagnetic switch and to subject said reversing relay to said first sender output voltage and to complete a maintaining circuit paralleling said running switch, and a switch responsive to a condition of said printing press and adapted upon response to terminate the influence of said first or second sender output voltage upon said reversing relay and to subject it to said third sender output voltage, and a normally closed pushbutton switch operable to deenergize said electromagnetic relay and said electromagnetic switch.

4. In a drive for printing presses and the like, in combination, a variable speed driving motor, a speed regulating resistor in circuit with said motor, a reversible pilot motor for varying said resistor, a receiver comprising a potentiometer supplied with a constant input voltage and affording a variable output voltage, means operable by said pilot motor for varying the output voltage of said receiver in accordance with variations of said resistor, a sender comprising a potentiometer supplied with a constant input voltage and provided with means of affording, a first output voltage corresponding to a desired running speed of said driving motor, a second output voltage corresponding to a desired value of said regulating resistor for starting and inching said driving motor, and a third output voltage corresponding to a creeping speed of said driving motor, a reversing relay adapted to control said pilot motor in response to the difference between the receiver output voltage and one of the sender output voltages, an inching pushbutton switch and a running pushbutton switch, both biased to open position, an electromagnetic switch energizable by said inching switch to connect said motor to a source of current supply, an electromagnetic relay energizable by the closure of said running switch, said electromagnetic relay being adapted when deenergized to subject said reversing relay to said second sender output voltage and adapted when energized to energize said electromagnetic switch, and to subject said reversing relay to said first output voltage and to close a maintaining circuit paralleling said running switch, and a normally closed pushbutton switch operable to deenergize said electromagnetic relay and said electromagnetic switch.

5. In a drive for printing presses and the like, in combination, a variable speed driving motor, a speed regulating resistor in circuit with said motor, a reversible pilot motor for varying said resistor, a receiver comprising a potentiometer supplied with a constant input voltage and affording a variable output voltage, means operable by said pilot motor for varying the output voltage of said receiver in accordance with variations of said resistor, a sender comprising a potentiometer supplied with a constant input voltage and provided with means of affording, a first output voltage corresponding to a desired running speed of said driving motor, a second output voltage corresponding to a desired value of said regulating resistor for starting and inching said driving motor, and a third output voltage corresponding to a creeping speed of said driving motor, a reversing relay adapted to control said pilot motor in response to the difference between the receiver output voltage and one of the sender output voltages, an inching pushbutton switch and a running pushbutton switch, both biased to open position, an electromagnetic switch energizable by said inching pushbutton switch to connect said motor to a source of current supply, an electromagnetic relay normally subjecting said reversing relay to said second output voltage and energizable by operation of said running pushbutton switch to terminate the effect of said second output voltage upon said reversing relay and subjecting it to said first output voltage and to complete an energizing circuit for said electromagnetic switch, and a normally closed stop switch operable to deenergize said electromagnetic relay and said electromagnetic switch.

6. In a drive for printing presses and the like, in combination, a variable speed driving motor, a speed regulating resistor in circuit with said motor, a reversible pilot motor for varying said resistor, a receiver comprising a potentiometer supplied with a constant input voltage and affording a variable output voltage, means operable by said pilot motor for varying the output voltage of said receiver in accordance with variations of said resistor, a sender comprising a potentiometer supplied with a constant input voltage and provided with means affording, a first output voltage corresponding to a desired running speed of said driving motor, a second output voltage corresponding to a desired value of said regulating resistor for starting and inching said driving motor, and a third output voltage corresponding to a creeping speed of said driving motor, a reversing relay adapted to control said pilot motor in response to the difference between the receiver output voltage and one of the sender output voltages, an inching pushbutton switch and a running pushbutton switch, both biased to open position, an electromagnetic switch energizable by said inching pushbutton switch to connect said motor to a source of current supply, an electromagnetic relay normally subjecting said reversing relay to said second output voltage and energizable by operation of said running switch to terminate the effect of said second output voltage upon said reversing relay and subjecting it to said first output voltage and to complete an energizing circuit for said electromagnetic switch, a normally closed stop switch operable to deenergize said electromagnetic relay and said electromagnetic switch, and a switch responsive to an operating condition of said printing press and adapted upon response to terminate the influence of said first or second sender output voltage upon said reversing relay and to subject it to said third sender output voltage.

EDWIN W. SEEGER.
CARROLL STANSBURY.